May 30, 1939.  G. W. GRISDALE  2,160,266
MEASURING INSTRUMENT
Filed Sept. 11, 1937
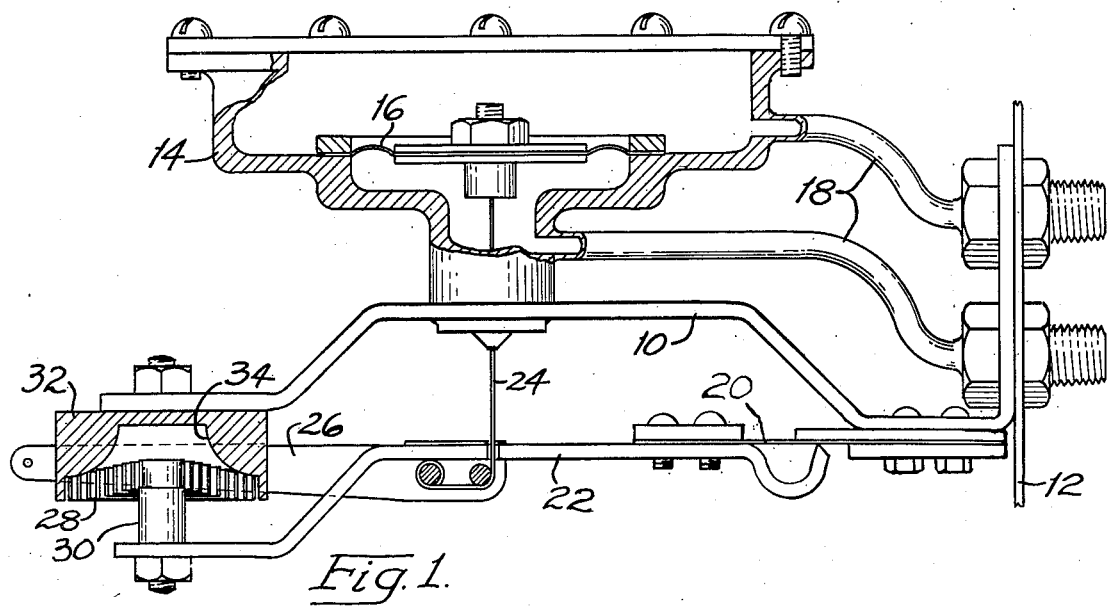
Fig. 1.
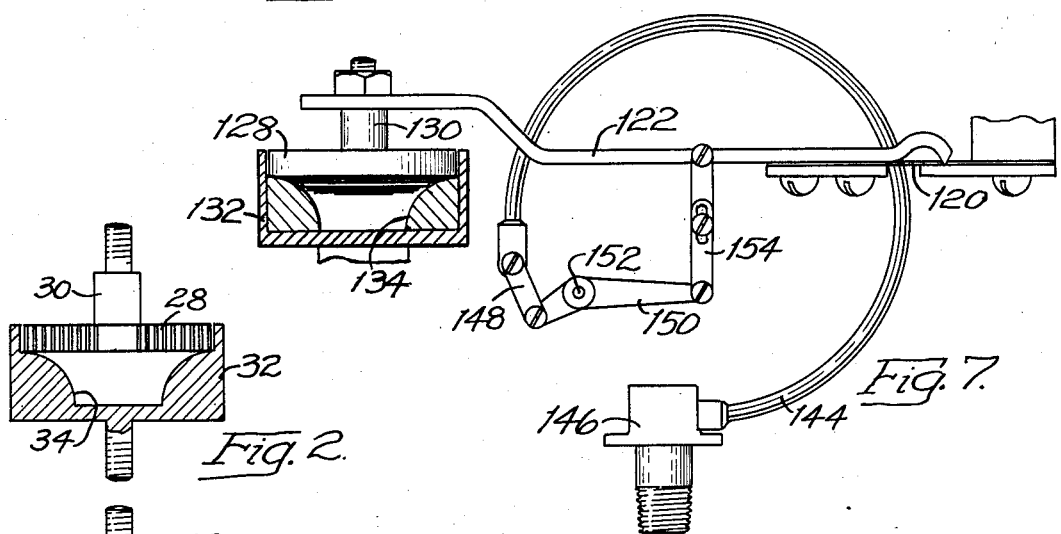
Fig. 7.
Fig. 2.
Fig. 3.
Fig. 6.
Fig. 5.
Fig. 4.
Inventor
George W. Grisdale
by McConkey Dawson & Booth
Attorneys Patented May 30, 1939

2,160,266

UNITED STATES PATENT OFFICE 2,160,266

MEASURING INSTRUMENT

George W. Grisdale, Chicago, Ill., assignor to Republic Flow Meters Company, Chicago, Ill., a corporation of Illinois Application September 11, 1937, Serial No. 163,361

8 Claims. (Cl. 267—1)

This invention relates to measuring instruments and has been illustrated as embodied in a flowmeter for measuring the rate of fluid flow.

One of the objects of the invention is to provide a measuring instrument such as a flowmeter which will give a direct indication of the condition being measured.

Another object of the invention is to provide a measuring instrument having a spring device for yieldingly resisting movement of a sensitive element in which the spring device has a variable characteristic.

Still another object of the invention is to provide a novel variable-characteristic spring device for use in a measuring instrument.

Other objects, advantages and novel features of the invention will be apparent from the following description when read in connection with the accompanying drawing, in which:

Figure 1 is an elevation with parts in section of a flowmeter element embodying the invention;

Figures 2, 3 and 4 are partial views similar to Figure 1 showing different positions;

Figure 5 is a detail view of the spring;

Figure 6 is a section of a modified cam construction; and

Figure 7 is a view similar to Figure 1 of a pressure gage embodying the invention.

The meter of Figure 1 includes a bracket 10 rigidly secured to and extending at right angles from a panel 12. A housing 14 is rigidly secured to the center part of the bracket 10 and incloses a flexible diaphragm 16 which is arranged horizontally across the central part of the housing to divide it into upper and lower pressure chambers. These chambers are connected by pipes 18 to sources of differential pressure, as for example to the opposite sides of an orifice in a flow conduit so that the diaphragm will be subjected to a differential pressure proportional to the square of the rate of flow through the conduit.

At its end adjacent the panel the bracket supports a leaf spring 20 which serves as a pivotal mounting for a lever 22 which is connected to the diaphragm 16 by a wire 24. An extension 26 on the lever is formed for connection with any suitable indicating or recording means for indicating or recording the flow value.

In the example illustrated the diaphragm 16 is arranged to exert an upward force on the lever 22 and upward movement of the lever is yieldingly opposed by a spring device. According to the present invention this spring device is formed by a flat resilient strip 28 wound into a flat spiral as seen in Figure 5 with the width of the strip parallel to the axis of the spiral. The end of the strip at the center of the spiral is secured to a hub 30 which is rigidly attached to the free end of the lever 22.

Movement of the spring is resisted by a cam member 32 rigidly mounted on the end of the bracket 10 and having a circular cam surface 34 lying around and at one side of the spring. The parts are so arranged that as the spring is deformed its edge will engage the cam surface at different points in the spring length, thereby to vary the effective length of the spring and to change its characteristic. In the form shown the cam surface is so formed as to give the spring a square root characteristic but it will be apparent that its shape could be varied to give the spring any desired characteristic.

When there is no flow there will be no force on the diaphragm and the spring will occupy its flat position as shown in Figure 2. As the flow develops the diaphragm will exert an upward force on the lever 22 proportional to the square of the flow and the spring will be distorted as shown in Figures 3 and 4. However, instead of exerting a constant resisting force the spring will exert a force varying with the square root of its movement due to the shortening of its effective length by contact of its edge with the cam surface 34. This square root effect balances out the square effect on the diaphragm 16 and gives the lever 22 a movement directly proportional to the rate of flow. Thus the indicating or recording means can be operated directly from the lever 22 without the interposition of any mechanism for varying the effect of the movement.

Figure 6 illustrates adjustable cam construction including a shell 36 to which a plurality of flexible strips 38 are secured at their upper ends. The lower ends of the strips engage a button 40 which serves to hold them in alinement and also acts as a mounting means for the shell. The configuration of the strips is controlled by a plurality of screws 42 which engage the outer surfaces thereof and serve as adjustable stops. By this arrangement the shape of the cam surface may be changed readily to change the characteristic of the spring.

Figure 7 illustrates the invention applied to a pressure gage, parts therein corresponding to like parts in Figure 1 being indicated by the same reference numbers plus 100. As shown a Bourdon tube 144 is rigidly secured at one end to a fitting 146 which serves to connect it to a source of pressure to be measured. The other end of the tube is connected through a link 148 with one end of a lever 150 pivoted at 152. The opposite end of the lever 150 is connected through an adjustable link 154 with the central portion of the lever 122.

This figure also illustrates a modified cam construction including a standard cup 132 adapted to receive cam inserts 134 which may be variably shaped to give any desired characteristic. In this way the characteristic of the spring may readily be changed by merely changing the cam inserts 134.

As pressure is applied to the tube 144, it will exert a force on the levers 150 and 122 proportional to the applied pressure. When it is desired to obtain a function of the pressure the spring device 128—134 may be employed to give the lever 122 a movement proportional to the desired function; for example, the square, square root, three halves power or the like. Thus to measure the discharge through a nozzle, the cam surface 134 may be shaped to give the spring a square root characteristic so that movement of the lever 122 will be proportional to the rate of discharge.

While several embodiments of the invention have been shown and described, it will be understood that many changes might be made therein and it is not intended to limit the scope of the invention to the exact forms shown nor otherwise than by the terms of the appended claims.

What is claimed is:

1. A measuring instrument comprising a sensitive element movable in response to changes in a condition to be measured, a spring for yieldingly resisting movement of said element in one direction, said spring being formed of a resilient flat strip so mounted as to be deformed in the direction of its width as the element moves, and a guide for said spring having a surface adapted to engage the edge of the spring at different points in its length as the spring is deformed to give the element an irregular movement proportional to a function of variations in the condition.

2. A measuring instrument comprising a sensitive element movable in response to changes in a condition to be measured, a spring for yieldingly resisting movement of said element in one direction, said spring being arranged in a spiral, and a guide having a surface substantially circular in cross-section and concentric with the spring and adapted to engage the spring at different points to vary its effective length to give the element an irregular movement proportional to a function of variations in the condition.

3. A measuring instrument comprising a sensitive element movable in response to changes in a condition to be measured, a spring for yieldingly resisting movement of said element in one direction, said spring being formed of a resilient flat strip wound in a spiral, and a guide having a substantially circular surface concentric with the spiral and adapted to engage the edge of the strip to vary the effective length thereof to give the element an irregular movement proportional to a function of variations in the condition.

4. A measuring instrument comprising a sensitive element movable in response to changes in a condition to be measured, a spring for yieldingly resisting movement of said element in one direction, said spring being formed of a resilient flat strip wound in a spiral and connected to said element to be deformed in the direction of its width, and a guide having a substantially circular surface concentric with the spiral and adapted to engage the edge of the strip to vary the effective length thereof to give the element an irregular movement proportional to a function of variations in the condition.

5. A measuring instrument comprising a sensitive element movable in response to changes in a condition to be measured, a spring for yieldingly resisting movement of said element in one direction, said spring being formed of a resilient flat strip wound into a spiral with its width parallel to the axis of the spiral and connected to the sensitive element at its center, and a guide having a circular cam surface at one side of the spiral to engage the edge of the strip thereby to change its effective length to give the element an irregular movement proportional to a function of variations in the condition.

6. A measuring instrument comprising a sensitive element movable in response to changes in a condition to be measured, a spring for yieldingly resisting movement of said element in one direction, said spring being formed of a resilient flat strip wound into a spiral with its width parallel to the axis of the spiral and connected to the sensitive element at its center, and a guide having a circular cam surface at one side of the spiral to engage the edge of the strip thereby to change its effective length, said guide including a deformable member and a plurality of adjustable stops engageable with said member to vary its shape.

7. In a measuring instrument, a spring device comprising a spiral spring connected at one end to a movable part of the instrument, and a relatively stationary guide for said spring having a cam surface concentric with the spiral to engage the spring at different points in its length as it is distorted, said cam surface being formed by a plurality of deformable strips and adjustable stops to vary the shape of said strips.

8. In a measuring instrument, a spring device comprising a resilient flat strip wound into a spiral with its width parallel to the spiral axis and connected at its center to a movable part of the instrument, and a relatively stationary guide having a concave cam surface at one side of the spiral to engage the edge of the strip at different points as the strip is deformed, said cam surface being formed by a plurality of deformable strips and adjustable stops to vary the shape of said strips.

GEORGE W. GRISDALE.